US012793866B2

(12) United States Patent
Kim et al.

(10) Patent No.: US 12,793,866 B2
(45) **Date of Patent: *Nov. 10, 2026**

(54) $BiI_3$-PDMS COMPOSITE MATERIAL FOR X-RAY SHIELDING AND MANUFACTURING METHOD THEREOF

(71) Applicant: PUKYONG NATIONAL UNIVERSITY INDUSTRY-UNIVERSITY COOPERATION FOUNDATION, Busan (KR)

(72) Inventors: Junghwan Kim, Busan (KR); Seok Gyu Kang, Gimhae-si (KR); Ha Yeong Kang, Hadong-gun (KR); Dae Seong Kwon, Gimhae-si (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 434 days.

This patent is subject to a terminal disclaimer.

(21) Appl. No.: 18/491,594

(22) Filed: Oct. 20, 2023

(65) Prior Publication Data

US 2024/0136079 A1 Apr. 25, 2024
US 2024/0233970 A9 Jul. 11, 2024

(30) Foreign Application Priority Data

Oct. 21, 2022 (KR) ........................ 10-2022-0136252

(51) Int. Cl.
*G21F 1/10* (2006.01)

(52) U.S. Cl.
CPC .................................... *G21F 1/103* (2013.01)

(58) Field of Classification Search
None
See application file for complete search history.

(56) References Cited

FOREIGN PATENT DOCUMENTS

| | | | | | |
|---|---|---|---|---|---|
| CN | 115785585 A | * | 3/2023 | ............... | G21F 1/10 |
| JP | 2021135278 | | 9/2021 | | |
| WO | WO-2023200942 A2 | * | 10/2023 | ............... | C09D 5/32 |

OTHER PUBLICATIONS

Nam et al., "Hydrophobic and Hydrophilic PDMS Sponges Prepared Through Physicochemical Treatments" *Transactions of the Korean Society of Mechanical Engineers A*, 2016, 40(8), pp. 737-742.

* cited by examiner

*Primary Examiner* — Tanisha Diggs
(74) *Attorney, Agent, or Firm* — NORTON ROSE FULBRIGHT US LLP

(57) ABSTRACT

A method for producing a lead-free X-ray shielding material using bismuth iodide is provided, the method including a first step of producing porous PDMS (Polydimethylsiloxane); a second step of producing a mixed solution of $BiI_3$ and THF; and a third step of immersing the porous PDMS into the mixed solution such that the $BiI_3$ is loaded into the porous PDMS to produce a $BiI_3$-PDMS composite material.

6 Claims, 13 Drawing Sheets

FIG. 2
(a)
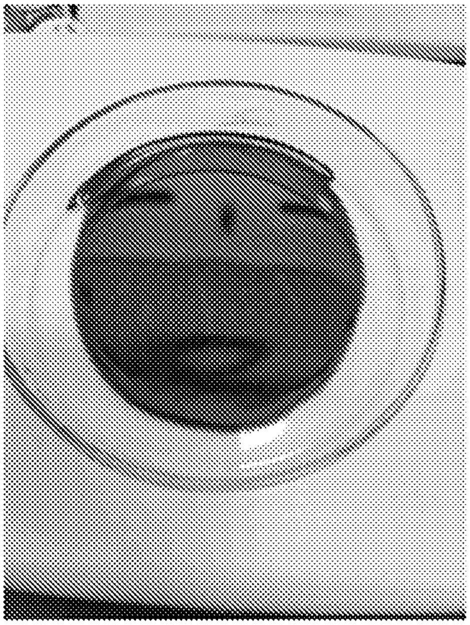
(b)
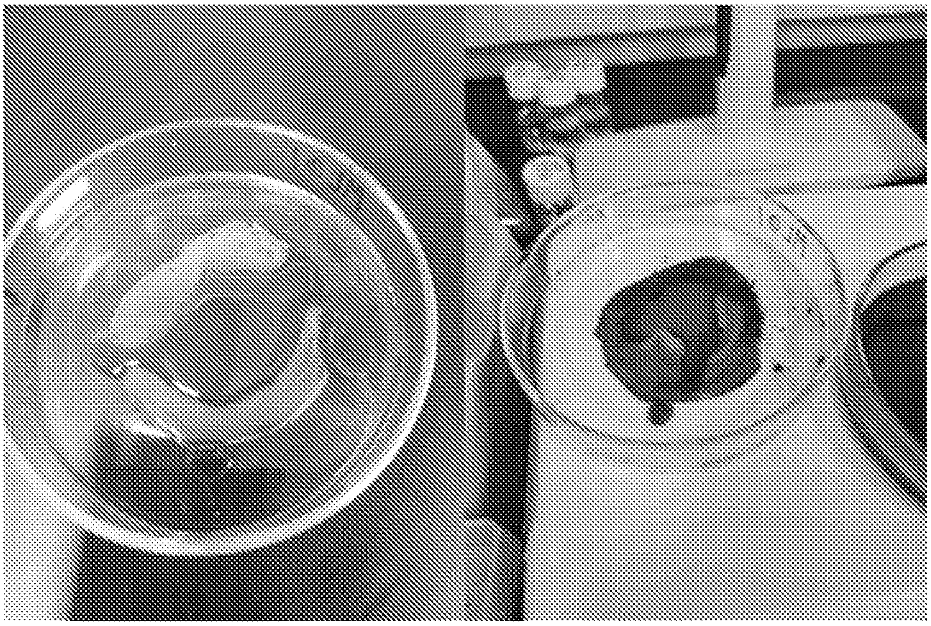

Quantachrome® ASiQwin™- Automated Gas Sorption Data
Acquisition and Reduction
© 1994-2013, Quantachrome Instruments
version 3.01

Quantachrome INSTRUMENTS

| **Analysis** | | | | **Report** | | |
|---|---|---|---|---|---|---|
| **Operator:** | Gas sorption analyzer **Date:**2022/07/26 | | | **Operator:** Gas sorption analyzer | | **Date:**2022/07/28 |
| **Sample ID:** | 2 | **Filename:** | 2207262.qps | | | |
| **Sample Desc:** | | **Comment:** | | | | |
| **Sample Weight:** | 0.6315 g | **Instrument:** | Autosorb iQ Station 1 | | | |
| **Outgas Time:** | 1.0 hrs | **Outgas Temp.:** | 120 ℃ | | | |
| **Analysis gas:** | Nitrogen | **Non-ideality:** | 6.58e-05 1/Torr | **CellType:** | 6mm w/o rod | |
| **Analysis Time:** | 5:28 hr:min | **Bath temp.:** | 77.35 K | | | |
| **Analysis Mode:** | Standard | | | **VoidVol Remeasure:** | off | |
| **VoidVol. Mode:** | He Measure | **Cold Zone V:** | 2.14116 cc | **Warm Zone V:** | 19.0683 cc | |

Multi-Point BET

Data Reduction Parameters Data

| | | | | | |
|---|---|---|---|---|---|
| | **Thermal Transpiration:** on | **Eff. mol. diameter (D):** | 3.54 Å | **Eff. cell stem diam. (d):** | 4.0000 mm |
| **Adsorbate** | **Nitrogen** | **Temperature** | 77.350K | | |
| | **Molec. Wt.:** 28.013 | **Cross Section:** | 16.200 Å² | **Liquid Density:** | 0.808 g/cc |

Multi-Point BET Data

| Relative Pressure [P/Po] | Volume @ STP [cc/g] | 1 / [ W((Po/P) - 1) ] | Relative Pressure [P/Po] | Volume @ STP [cc/g] | 1 / [ W((Po/P) - 1) ] |
|---|---|---|---|---|---|
| 5.07404e-02 | 0.9595 | 4.4575e+01 | 9.07489e-02 | 1.7272 | 4.6235e+01 |
| 6.05980e-02 | 1.1526 | 4.4779e+01 | 1.00971e-01 | 1.9384 | 4.6358e+01 |
| 6.90288e-02 | 1.3137 | 4.5159e+01 | 1.99190e-01 | 3.8667 | 5.1469e+01 |
| 8.04921e-02 | 1.5308 | 4.5754e+01 | | | |

BET summary

| | |
|---|---|
| **Slope =** | 47.335 |
| **Intercept =** | 4.193e+01 |
| **Correlation coefficient, r =** | 0.997068 |
| **C constant=** | 2.129 |
| **Surface Area =** | 39.015 m²/g |

FIG. 5

(In-lab system)

| | 3mm | 4mm | 5mm | 6mm | 7mm | 8mm | 9mm | 10mm |
|---|---|---|---|---|---|---|---|---|
| 1st | 44.0090 | 36.6308 | 40.1504 | 28.7637 | 44.8667 | 25.0752 | 25.3713 | 33.2954 |
| 2nd | 42.9664 | 42.8097 | 40.2056 | 42.7048 | 44.8843 | 32.6387 | 30.5449 | 33.3114 |
| 3rd | 46.7854 | 38.5317 | 40.8961 | 42.5540 | 45.4500 | 35.3808 | 33.1197 | 21.0269 |
| 4th | 45.3482 | 42.8925 | 35.0286 | 42.3734 | 38.6965 | 37.5718 | 33.5956 | 19.7113 |
| 5th | 47.3852 | 38.4952 | 46.9414 | 42.1846 | 45.4218 | 34.9876 | 20.3708 | 33.4368 |
| average | 45.2988 | 39.8720 | 40.6444 | 39.7161 | 43.8639 | 33.1308 | 28.6005 | 28.1564 |

| | 3mm | 4mm | 5mm | 6mm | 7mm | 8mm | 9mm | 10mm |
|---|---|---|---|---|---|---|---|---|
| 1st | 18.8699 | 12.8692 | 10.2672 | 9.7168 | 10.1972 | 9.4178 | 8.4255 | 7.4897 |
| 2nd | 15.6293 | 12.5640 | 10.5124 | 8.2226 | 9.6437 | 8.7599 | 7.5303 | 7.0035 |
| 3rd | 18.4547 | 12.9026 | 10.0498 | 9.2901 | 8.1606 | 8.5194 | 7.4985 | 7.8574 |
| 4th | 11.0350 | 12.1675 | 8.8345 | 9.6877 | 9.3065 | 9.3867 | 7.4427 | 7.3394 |
| 5th | 18.5173 | 9.6942 | 8.6757 | 8.9577 | 8.2772 | 9.4361 | 7.4142 | 6.5604 |
| average | 16.50124 | 12.0395 | 9.66792 | 9.17498 | 9.11704 | 9.10398 | 7.66224 | 7.25008 |

| | 3mm | 4mm | 5mm | 6mm | 7mm | 8mm | 9mm | 10mm |
|---|---|---|---|---|---|---|---|---|
| 1st | 111.0860 | 104.4575 | 106.6028 | 129.9403 | 93.3879 | 63.1778 | 58.2913 | 84.0067 |
| 2nd | 169.3414 | 95.6278 | 109.1333 | 124.3530 | 143.1733 | 69.4956 | 70.7819 | 69.0612 |
| 3rd | 139.5961 | 109.5082 | 126.4228 | 98.5722 | 114.5311 | 91.3128 | 58.6016 | 60.9616 |
| 4th | 114.2376 | 143.0246 | 110.3355 | 85.7035 | 78.9876 | 64.3372 | 62.1722 | 54.5805 |
| 5th | 164.6014 | 142.2646 | 125.9648 | 121.2767 | 113.7727 | 91.4460 | 69.8921 | 50.2629 |
| average | 139.77 | 118.98 | 115.69 | 111.97 | 108.77 | 75.15 | 63.95 | 63.77 |

$BiI_3$-PDMS COMPOSITE MATERIAL FOR X-RAY SHIELDING AND MANUFACTURING METHOD THEREOF

CROSS-REFERENCE TO RELATED APPLICATION

This application claims a benefit under 35 U.S.C. § 119(a) of Korean Patent Application No. 10-2022-0136252 filed on Oct. 21, 2022, on the Korean Intellectual Property Office, the entire disclosure of which is incorporated herein by reference for all purposes.

BACKGROUND

1. Field

The present disclosure relates to a $BiI_3$-PDMS composite material for shielding X-rays, and more specifically, to a method for producing a lead-free X-ray shielding material using bismuth iodide, and the lead-free X-ray shielding material produced using the method.

2. Description of Related Art

Existing lead-based X-ray shielding materials have been most widely used due to their excellent X-ray shielding performance. However, problems such as lead's environmental problems, harmfulness thereof to the human body, poor fit thereof, and heavy weight thereof have been pointed out in many industries. In order to solve these problems, many researchers are conducting researches in the direction of replacing the lead in the development of the X-ray shielding material. However, chronic problems such as dispersion of a material in the shielding material and weight reduction of the shielding material still exist. Therefore, in replacing the existing lead-based shielding material, priority should be given to developing technology that secures lightness and flexibility based on excellent shielding performance.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a method for producing a lead-free X-ray shielding material using bismuth iodide.

Another purpose of the present disclosure is to provide a $BiI_3$-PDMS composite material for shielding X-rays.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

In one aspect of the present disclosure, a method for producing a lead-free X-ray shielding material using bismuth iodide is provided, the method comprising: a first step of producing porous PDMS (Polydimethylsiloxane); a second step of producing a mixed solution of $BiI_3$ and THF; and a third step of immersing the porous PDMS into the mixed solution such that the $BiI_3$ is loaded into the porous PDMS to produce a $BiI_3$-PDMS composite material.

The present disclosure relates to the development of an alternative material to replace the lead-based shielding material that has been used conventionally. For this purpose, a material using iodine metal, especially, $BiI_3$ and PDMS has been developed. $BiI_3$ is a compound of Bi (bismuth) which has excellent X-ray shielding ability, and I (iodine) which is widely used as a contrast agent in the medical field. In general, $BiI_3$ in a powder form may be applied as a shielding material while being loaded in another medium rather than being used alone. Among various media, the PDMS has a simple production process, is highly transparent, light, and human-friendly. However, when $BiI_3$ in the powder form is simply mixed with PDMS to form a composite, the powders may not be dispersed uniformly due to a difference in dissolution, and the mechanical properties of PDMS may be changed. To solve this problem, in accordance with the present disclosure, a uniform and high-density $BiI_3$-PDMS composite material was produced via adsorption of a liquid $BiI_3$ solution into porous PDMS.

In one implementation of the method, the first step includes: producing a mixed solution by mixing PDMS, a curing agent, and salt (NaCl); mixing the mixed solution using a centrifuge to bring the salt particles into contact with each other within the PDMS; curing the mixed solution; and immersing the curing product into water to remove the NaCl therefrom to produce the porous PDMS.

In one implementation of the method, in the second step, the mixed solution of $BiI_3$ and THF is produced at a ratio of $BiI_3$ 1.4 g:THF 6 ml.

In one implementation of the method, in the third step, the porous PDMS has been immersed in the mixed solution for 15 to 20 hours.

In one implementation of the method, in the third step, the porous PDMS is immersed into the mixed solution such that the $BiI_3$ is loaded into the porous PDMS in a repeated manner at least three times.

In one implementation of the method, the method further comprises, after the third step, drying the PDMS at 50 to 70° C. for 20 to 60 minutes to remove the THF therefrom such that only the $BiI_3$ is loaded into the PDMS.

Another aspect of the present disclosure provides a $BiI_3$-PDMS composite material for shielding X-rays, wherein the $BiI_3$-PDMS composite material is produced by the method as described above, wherein the bismuth iodide has been loaded into the porous PDMS.

In one implementation of the $BiI_3$-PDMS composite material, a thickness of the porous PDMS is in a range of 3 mm to 10 mm.

In one implementation of the $BiI_3$-PDMS composite material, when a tube voltage is 60 kV, a shielding ratio of the $BiI_3$-PDMS composite material is 61% or greater.

In one implementation of the $BiI_3$-PDMS composite material, when a tube voltage is 100 kV, a shielding ratio of the $BiI_3$-PDMS composite material is 57% or greater.

The method of the present disclosure may produce a lead-free, lightweight, flexible radiation shielding material. In the future, harm thereof to the human body and the environment may be minimized via sealing thereof with a separate encapsulant. A lightweight radiation shielding fibers may be produced via adsorption thereof onto fibers.

Furthermore, the radiation shielding fiber may be used to produce a lightweight radiation shielding clothing, which may significantly improve the lightweight and usability of shielding material clothing or equipment in the medical field. The shielding material market may be broadly expanded to high value-added industries such as electronic devices and high-tech precision industries as well as the aerospace industry, medical industry, and military. The shielding material may be utilized to meet the needs of a wider range of other industries.

In addition to the effects as described above, specific effects in accordance with the present disclosure will be described together with the detailed description for carrying out the disclosure.

BRIEF DESCRIPTION OF DRAWINGS

FIG. 2 is a photograph of a simple mixture of PDMS and $BiI_3$+THF.

FIG. 5 shows the results of BET measurement of the porous PDMS.

DETAILED DESCRIPTION

Figure 1:
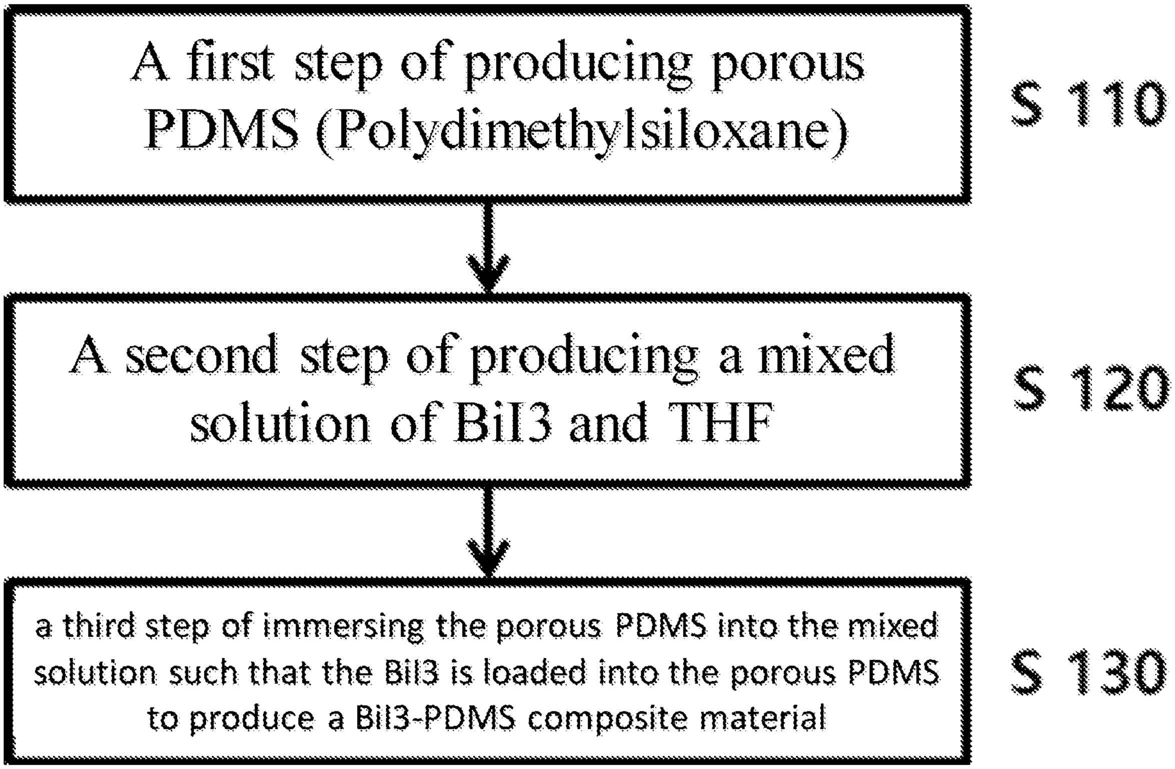
FIG. 1 is a flowchart showing a producing method of the present disclosure.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

For an example, $BiI_3$ was adsorbed onto porous PDMS and a low-dose X-ray shielding experiment was conducted on the porous PDMS which had adsorbed the $BiI_3$. As a result of the experiment, it was identified that the $BiI_3$ had a shielding effect, and its performance was maximized depending on a weight ratio and a thickness.

Example 1: Method for Producing $BiI_3$-PDMS Composite Material

Figure 3:
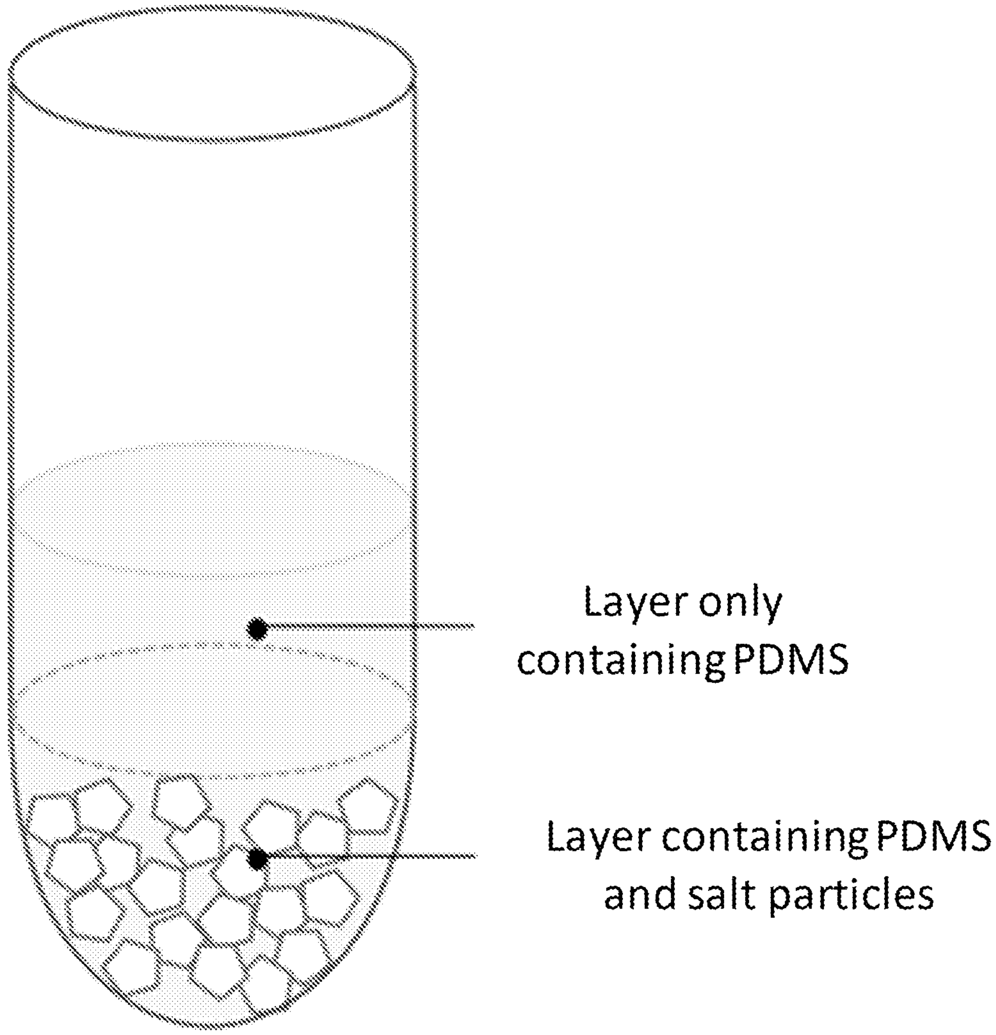
FIG. 3 is a schematic diagram of a process of producing porous PDMS.
Figure 4:
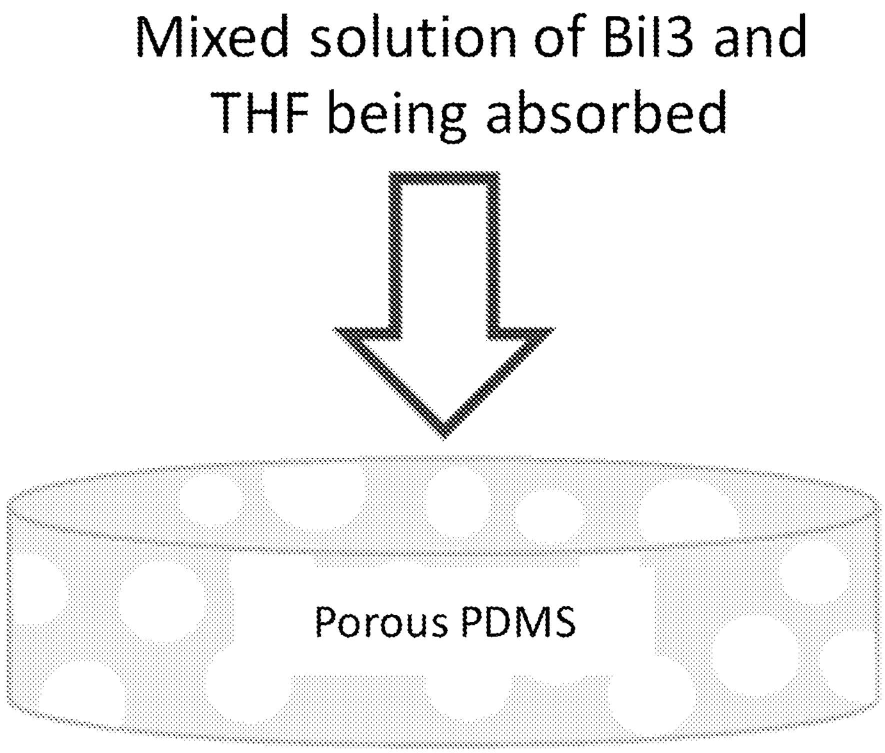
FIG. 4 is a schematic diagram of a process of producing a $BiI_3$–PDMS composite material.

FIG. 1 is a flowchart showing the producing method of the present disclosure, FIG. 2 is a photograph of a simple mixture of PDMS and $BiI_3$+THF, FIG. 3 is a schematic diagram of a process of producing the porous PDMS, and FIG. 4 is a schematic diagram of a process of producing the $BiI_3$-PDMS composite material.

Referring to FIG. 1, FIG. 2, FIG. 3, and FIG. 4, when liquid PDMS and $BiI_3$+THF were simply mixed with each other, a curing did not occur ((a) in FIG. 2). Furthermore, when $BiI_3$+THF was coated on a cured PDMS film, the cured PDMS was not separated from a dish ((b) in FIG. 2).

To produce the $BiI_3$-PDMS composite material, PDMS (Polydimethylsiloxane), a curing agent, and salt (NaCl) were first mixed with each other to prepare a mixed solution. At this time, each of salt with a large particle size and salt with a small particle size was used at 1 wt %, 0 wt %, and 1.5 wt %.

Afterwards, the mixed solution was subjected to further mixing for 20 minutes at 8,000 rpm using a centrifuge. This process was repeated three times, and then, excess PDMS was removed therefrom to allow the salt particles to contact each other within the PDMS.

After the reaction was completed, the PDMS was heat-treated at 60° C. for 18 hours and was cut into a coin shape with a thickness of 3 mm.

The coin-shaped PDMS was immersed in water at 60° C. for 18 hours to remove the water-soluble salt particles therefrom to produce the porous PDMS. The porous PDMS was fabricated so as to have a thickness in a range of 3 to 10 mm by an 1 mm increment and a diameter of 25 mm.

Next, $BiI_3$ and a THF solution were mixed with each other ($BiI_3$ 1.4 g:THF 6 ml) to prepare a bismuth iodide solution as an adsorption target.

Finally, the porous PDMS was immersed in the bismuth iodide solution for 18 hours such that $BiI_3$ was loaded into the porous PDMS. To remove the THF therefrom, drying was performed thereon at 60° C. for 30 minutes.

As a reference, porous PDMS into which the $BiI_3$ was not loaded was produced based on a varying thickness using the same method.

FIG. 5 shows the results of BET measurement of the porous PDMS.

Referring to FIG. 5, the porous PDMS produced in Example 1 was measured using a BET (Brunauer Emmett Teller). A specific surface thereof area was measured as 39.015 m2/g.

Figure 6:
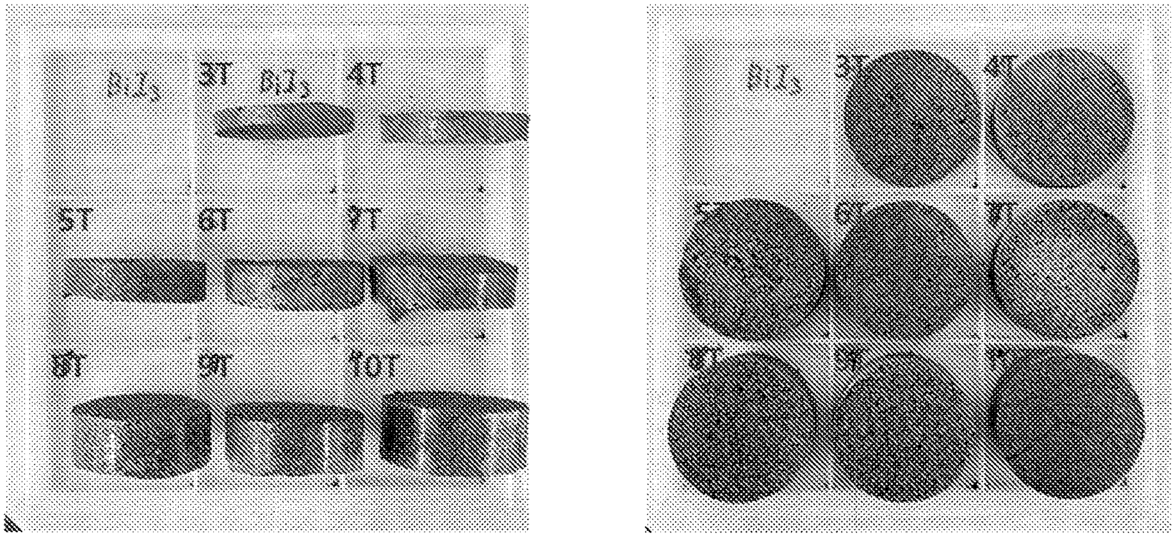
FIG. 6 shows photographs of a $BiI_3$-PDMS composite material based on a varying thickness.
Figure 7:
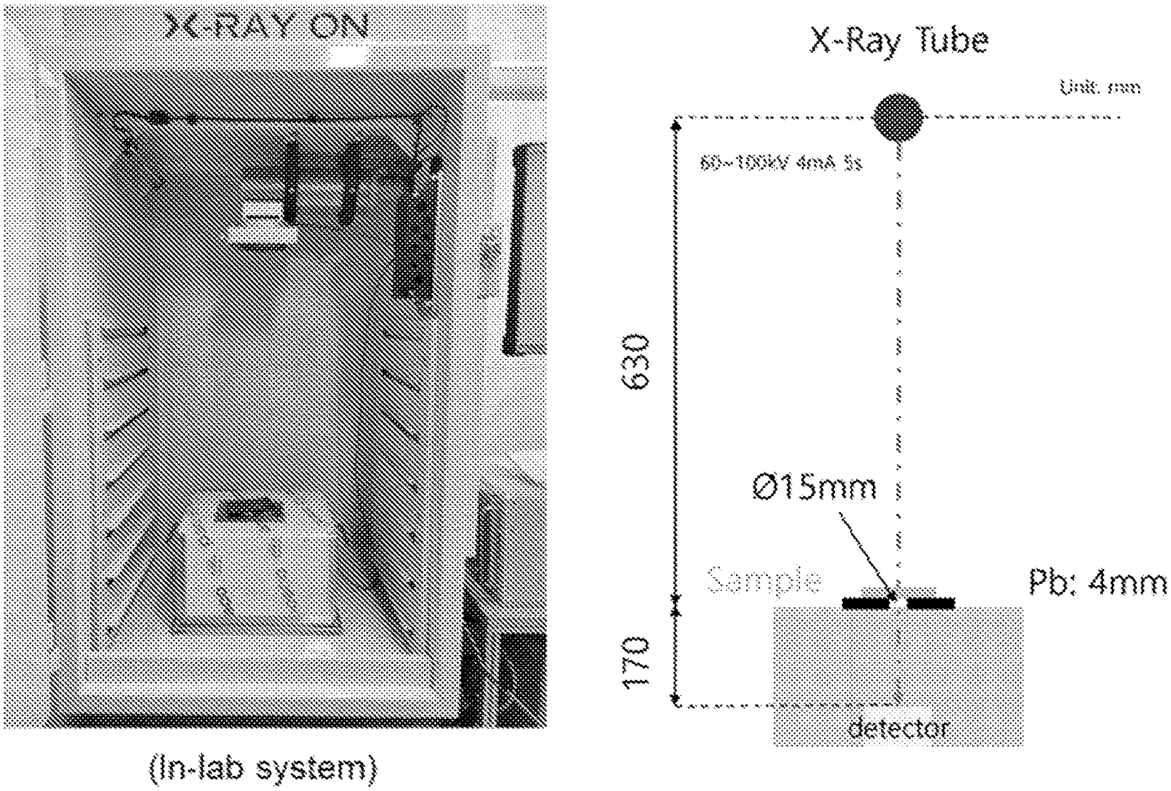
FIG. 7 is a photograph and a diagram of an environment for testing a shielding ability of the $BiI_3$-PDMS composite material.
Figure 8:
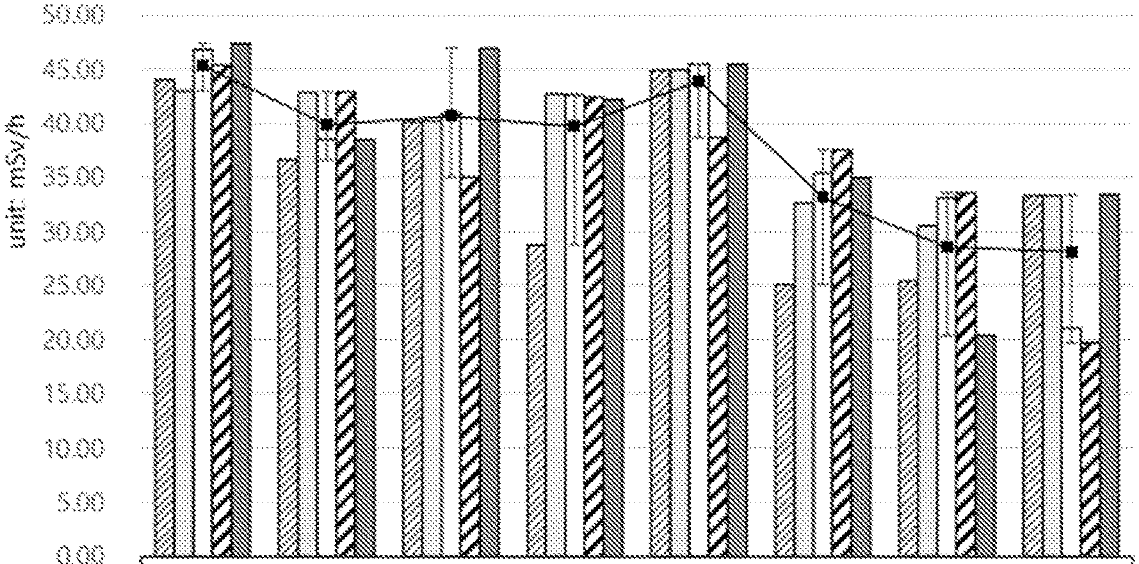
FIG. 8 is a graph of a shielding ability experiment result of the porous PDMS at a tube voltage of 60 kV.
Figure 9:
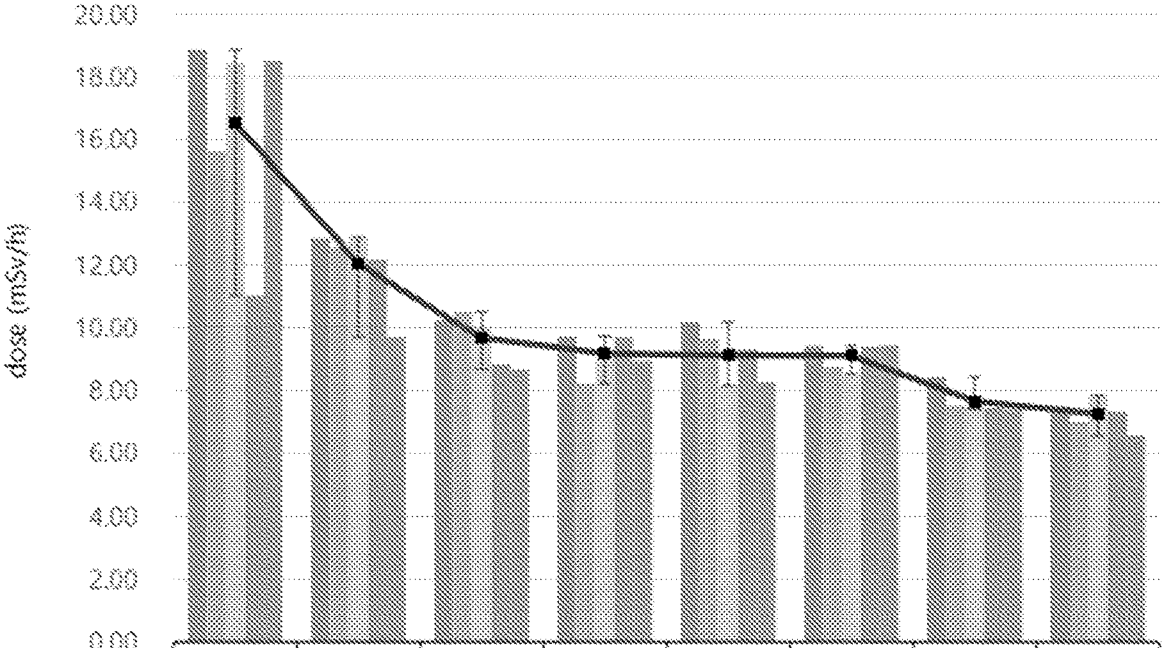
FIG. 9 is a graph of a shielding ability experiment result of the $BiI_3$-PDMS composite material at a tube voltage of 60 kV.
Figure 10:
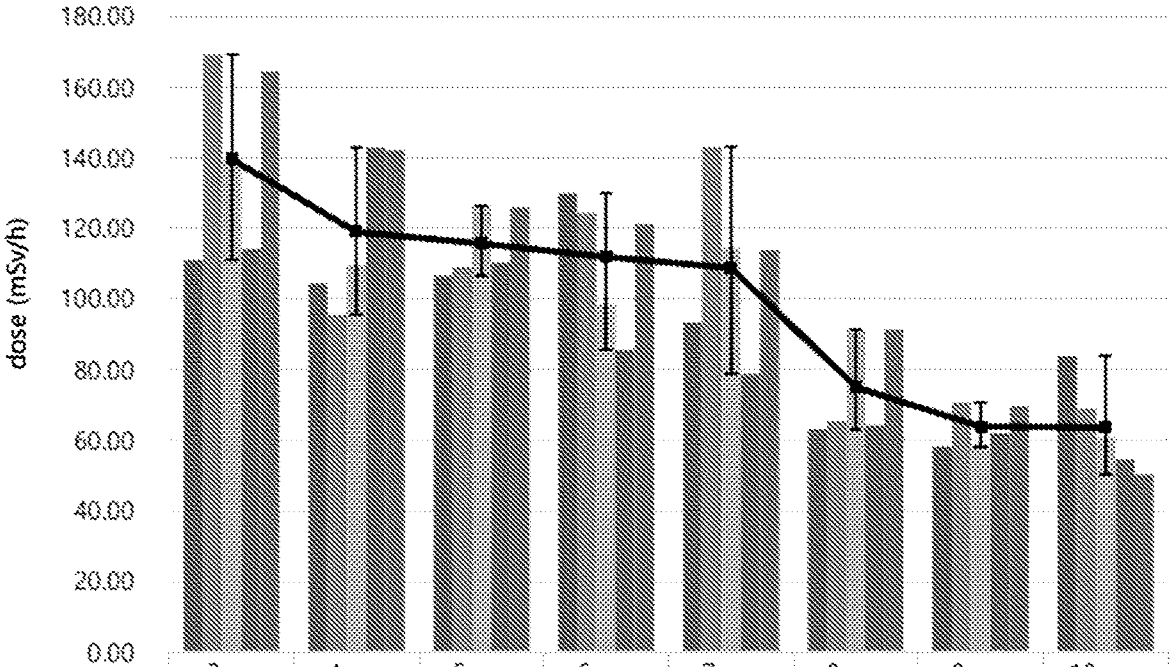
FIG. 10 is a graph of the shielding ability test of $BiI_3$-PDMS composite material at a tube voltage of 100 kV.

Experimental Example 1: Shielding Ability Experiment of $BiI_3$–PDMS Composite Material Based on Varying Thickness FIG. 6 shows photographs of $BiI_3$-PDMS composite material based on a varying thickness. FIG. 7 is a photograph and a diagram of a shielding ability test environment of the $BiI_3$-PDMS composite material. FIG. 8 is a graph of a shielding ability experiment result of the porous PDMS at a tube voltage of 60 kV. FIG. 9 is a graph of a shielding ability test result of the $BiI_3$-PDMS composite material at a tube voltage of 60 kV. FIG. 10 is a graph of a shielding ability test result of the $BiI_3$-PDMS composite material at a tube voltage of 100 kV.

Referring to FIG. 6, FIG. 7, FIG. 8, FIG. 8, and FIG. 10, side and top views of the $BiI_3$–PDMS composite material based on a varying thickness (3T=3 mm, 4T=4 mm, 5T=5 mm, 6T=6 mm, 7T=7 mm, 8T=8 mm, 9T=9 mm, 10T=10 mm) may be identified.

An aperture layer with a diameter of 15 mm and a $BiI_3$-PDMS composite material sample were sequentially placed on a support of an X-Ray shielding ability test bench. Then, X-rays were irradiated toward the sample using an X-ray tube above the support. X-rays that have passed through the sample pass through the aperture layer and are incident on a detector located within the support. At this time, the X-ray tube voltage was 60 and 100 kV. As a reference example, the X-ray shielding ability was measured using the porous PDMS into which the $BiI_3$ was not loaded when the tube voltage was 60 kV.

The X-Ray shielding ratio based on the thickness of PDMS may be identified in Table 1, Table 2, and Table 3 below. First, it was identified that when a reference measurement value was 43.1069 mSv/h, the porous PDMS into which the $BiI_3$ was not loaded as the reference example exhibited a shielding ratio in a range of −5.08 to 34.68%, while the $BiI_3$–PDMS composite material exhibited a shielding ratio in a range of 61.72 to 83.18%, which was significant improvement of at least two times of that of the reference example. The $BiI_3$–PDMS composite material exhibited a shielding ratio of 61.72% at the smallest thickness of 3 mm, and, further, the shielding ratio thereof increased as the thickness thereof increased. The shielding ratio thereof was 83.18% at the largest thickness of 10 mm, which was increased by about 20% compared to that when the thickness was 3 mm.

Next, it was identified that when the reference measurement value was 328.4768 mSv/h, the shielding ratio ranged from 57.45 to 80.58%. It was identified that even as the reference measurement value increased, the shielding ratio was over 50%. Even when the reference measurement value was 328.4768 mSv/h, the shielding ratio increased as the thickness increased.

TABLE 1

| | Thickness (mm) | | | | | | | |
|---|---|---|---|---|---|---|---|---|
| | 3 | 4 | 5 | 6 | 7 | 8 | 9 | 10 |
| Weight (g) | 0.8982 | 1.3544 | 1.1137 | 1.7626 | 1.4778 | 2.488 | 2.7161 | 3.1203 |
| Shielding ratio(%) | −5.08 | 7.50 | 5.71 | 7.87 | −1.76 | 23.14 | 33.65 | 34.68 |

TABLE 2

| | Thickness (mm) | | | | | | | |
|---|---|---|---|---|---|---|---|---|
| | 3 | 4 | 5 | 6 | 7 | 8 | 9 | 10 |
| Weight (g) | 1.1690 | 1.7683 | 1.6035 | 2.3020 | 3.4604 | 3.4822 | 3.8840 | 3.9094 |
| Shielding ratio(%) | 61.72 | 72.07 | 77.57 | 78.72 | 78.85 | 78.88 | 82.23 | 83.18 |

TABLE 3

| | Thickness (mm) | | | | | | | |
|---|---|---|---|---|---|---|---|---|
| | 3 | 4 | 5 | 6 | 7 | 8 | 9 | 10 |
| Weight (g) | 1.1690 | 1.8380 | 1.6090 | 2.2624 | 3.6405 | 3.0996 | 3.5626 | 3.9037 |
| Shielding ratio(%) | 57.45 | 63.78 | 64.78 | 65.91 | 66.89 | 77.12 | 80.53 | 80.58 |

Experimental Example 2: Shielding Ability Experiment of $BiI_3$–PDMS Composite Material Based on Number of $BiI_3$ Adsorptions FIG. 11 is a photograph of the $BiI_3$–PDMS composite material based on the number of $BiI_3$ adsorptions, and FIG. 12 is a graph of the shielding ratio and the $BiI_3$ weight of the $BiI_3$-PDMS composite material based on the number of $BiI_3$ adsorptions.

Figure 11:
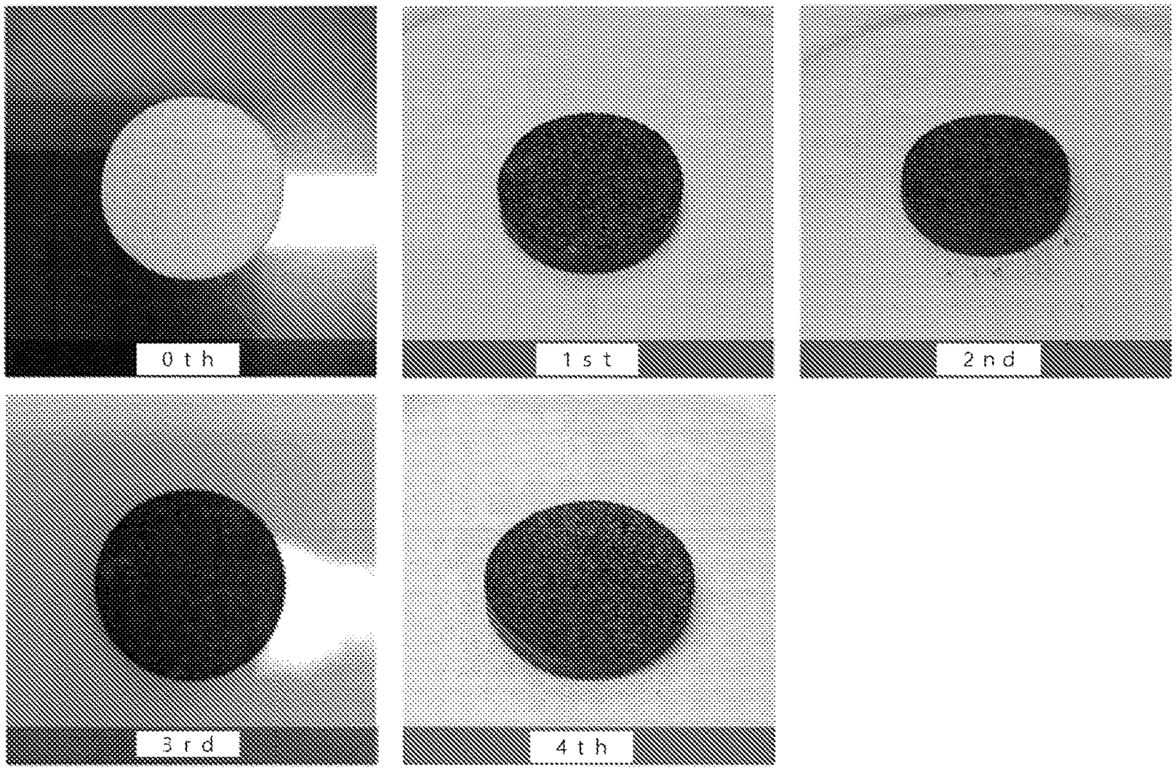
FIG. 11 is a photograph of the $BiI_3$-PDMS composite material based on the number of $BiI_3$ adsorptions.
Figure 12:
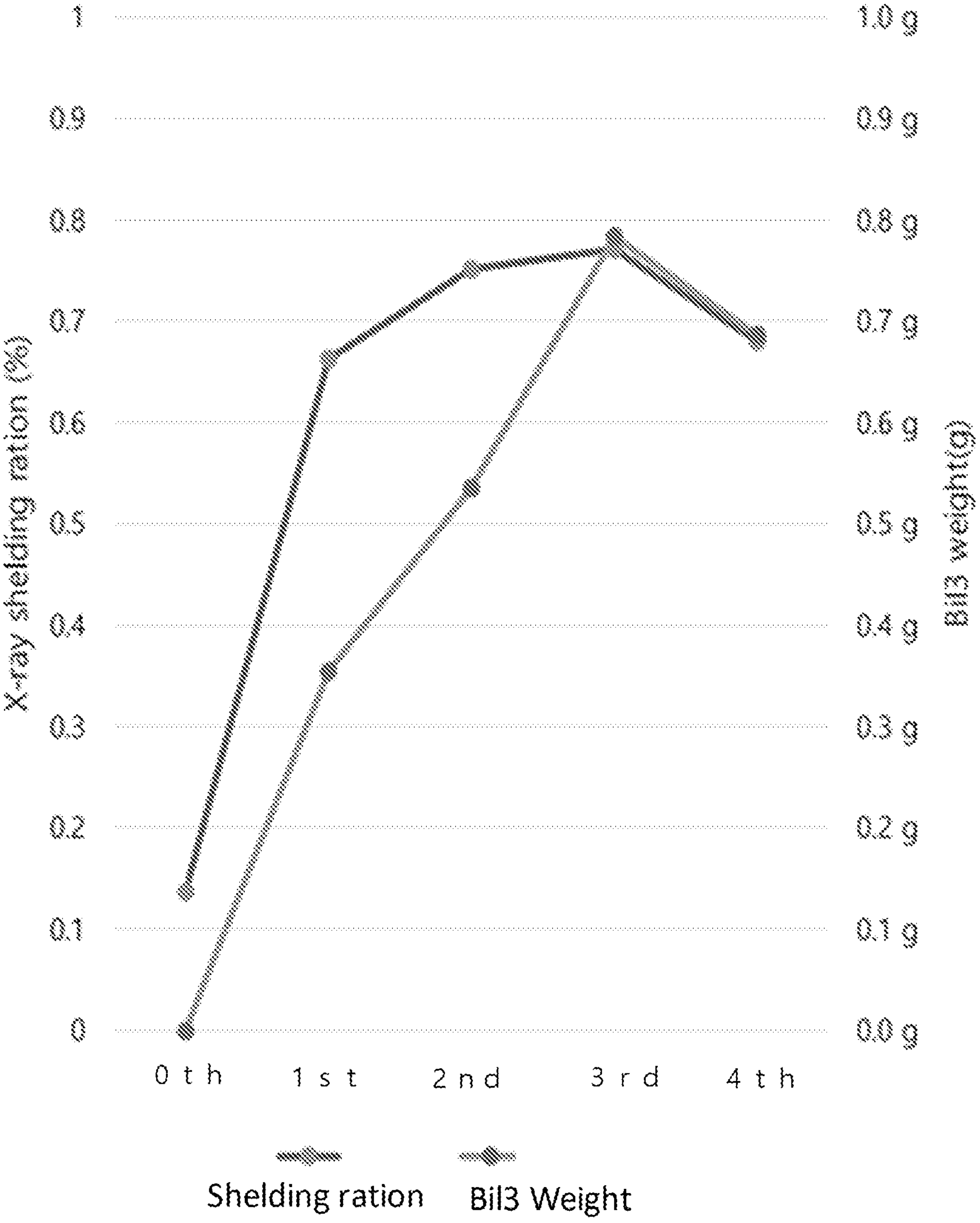
FIG. 12 is a graph of a shielding ratio of the $BiI_3$-PDMS composite material and a $BiI_3$ weight based on the number of $BiI_3$ adsorptions.

Referring to FIG. 11 and FIG. 12, in order to identify the optimal shielding ratio of the $BiI_3$–PDMS composite material based on the number of $BiI_3$ adsorptions, the porous PDMS specimen was fabricated so as to have a diameter of 25 mm and a thickness of 3 mm. Afterwards, a bismuth iodide solution as an adsorption target was prepared at a ratio of 1.4 g of $BiI_3$:6 ml of THF. Samples (number of adsorptions: 0, 1, 2, 3, 4) in which the porous PDMS adsorbed the $BiI_3$ solution 0 to 4 times were produced. The samples were dried at 60° C. for 30 minutes to remove THF therefrom.

When identifying an absorbed weight of $BiI_3$ of the $BiI_3$–PDMS composite material based on the number of $BiI_3$ adsorptions, the weight increased as the number of adsorptions increased. The largest absorbed weight thereof was 0.784 g when the number of $BiI_3$ adsorptions was three. When the number of $BiI_3$ adsorptions was four, the absorbed weight was 0.686 g, which was reduced by 0.0974 g compared to 0.784 g when the number of $BiI_3$ adsorptions was three. It was identified that the test result of the shielding ratio was the same as the test result of the absorbed weight. As the number of adsorptions increases, the shielding ratio gradually increases. The highest shielding ratio 77% was achieved when the number of $BiI_3$ adsorptions was three. However, when the number of $BiI_3$ adsorptions was four, the shielding ratio was slightly reduced to 68%. It was identified that when producing the $BiI_3$-PDMS composite material, the number of $BiI_3$ adsorptions was preferably 3. The adsorbed $BiI_3$ weight and the shielding ratio of the $BiI_3$–PDMS composite material based on the number of $BiI_3$ adsorptions may be identified in Table 4 below.

TABLE 4

| (Reference dose of X-rays: 60 mSv/h) | | | | |
|---|---|---|---|---|
| Number of $BiI_3$ adsorptions | Loaded $BiI_3$ weight (g) | Accumulated $BiI_3$ weight(g) | Dose (mSv/h) | X-ray shielding ratio (%) |
| 0 | 0 | 0 | 51.807 | 14 |
| 1 | 0.355 | 0.355 | 20.223 | 66 |
| 2 | 0.181 | 0.536 | 14.913 | 75 |
| 3 | 0.2481 | 0.784 | 13.736 | 77 |
| 4 | −0.0974 | 0.686 | 19.182 | 68 |

Experimental Example 3: Shielding Ability Experiment of $BiI_3$–PDMS Composite Material at Maximum Number of $BiI_3$ Adsorptions FIG. 13 is a graph of the shielding ratio based on a varying thickness of the $BiI_3$–PDMS composite material in which $BiI_3$ was adsorbed into the PDMS at the maximum number of times, and FIG. 14 is a graph of the shielding ratio based on a tube voltage of the $BiI_3$–PDMS composite material in which the $BiI_3$ was adsorbed into the PDMS at the maximum number of times.

Figure 13:
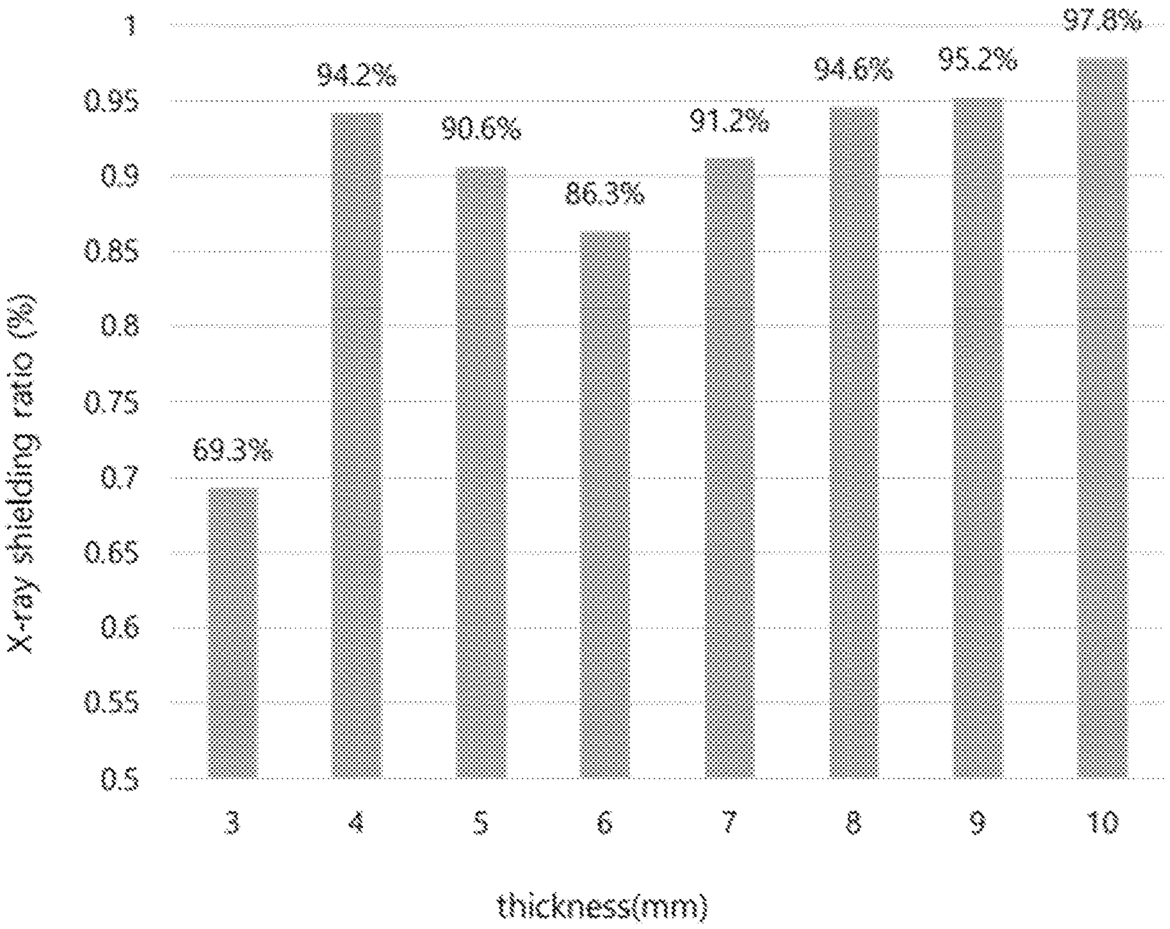
FIG. 13 is a graph of a shielding ratio based on a varying thickness of the $BiI_3$-PDMS composite material in which the PDMS has adsorbed $BiI_3$ at the maximum number of times.
Figure 14:
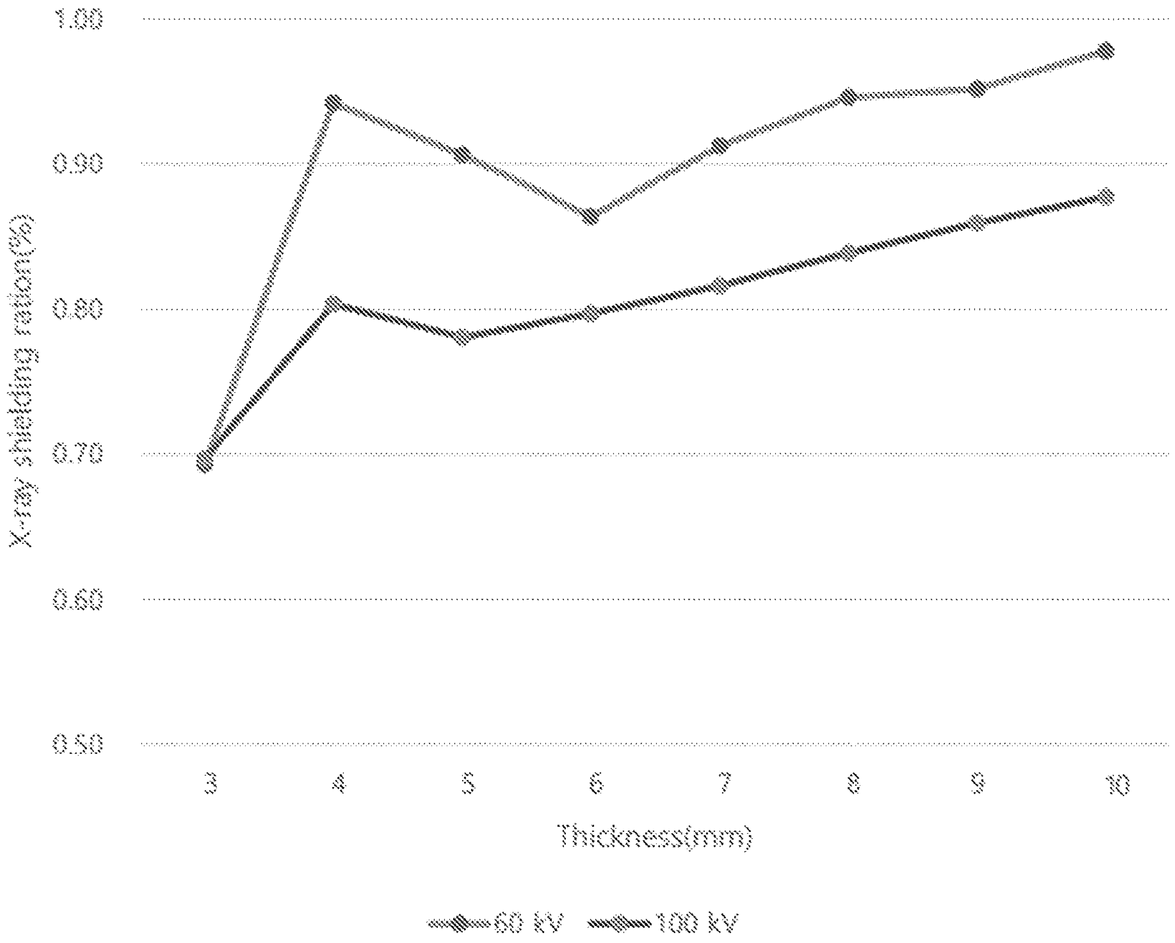
FIG. 14 is a graph of the shielding ratio according to tube voltage of $BiI_3$-PDMS composite material that adsorbed $BiI_3$ at the maximum number of times.

Referring to FIG. 13 and FIG. 14, the characteristics of the $BiI_3$–PDMS composite material at the maximum number of $BiI_3$ adsorptions may be identified.

First, the shielding ratio based on the varying thickness of the $BiI_3$–PDMS composite material when the $BiI_3$ adsorption was performed at the maximum number of times may be identified in Table 5 below. It was identified that the shielding ratio was the lowest, that is, 69.3% when the thickness was 3 mm, while the shielding ratio was the highest, that is, 97.8% when the thickness was 10 mm. In general, the shielding ratio was increased when the thickness was increased.

Next, the shielding ratio based on the tube voltage and based on the varying thickness of the $BiI_3$–PDMS composite material in which the $BiI_3$ adsorption was performed at the maximum number of times may be identified in Table 6 below. At both 60 kV and 100 kV, the shielding ratio increased as the thickness increased. However, the shielding ratio at 60 kV was higher than that at 100 kV. Furthermore, the shielding ratio was found to decrease somewhat when the thickness was increased from 4 mm to 6 mm. However, after 6 mm, the shielding ratio increased as the thickness increased.

TABLE 5

| (Reference dose of X-rays: 40 mSv/h) | | | |
|---|---|---|---|
| Thickness (mm) | Loaded $BiI_3$ weight (g) | Dose (mSv/h) | X-ray shielding ratio (%) |
| 3 | 0.489 | 12.292 | 69.27 |
| 4 | 1.101 | 2.326 | 94.19 |
| 5 | 1.182 | 3.741 | 90.65 |
| 6 | 1.025 | 5.464 | 86.34 |
| 7 | 1.033 | 3.506 | 91.24 |
| 8 | 1.465 | 2.166 | 94.59 |
| 9 | 1.301 | 1.929 | 95.18 |
| 10 | 1.507 | 0.886 | 97.78 |

TABLE 6

| | Thickness (mm) | | | | | | | |
|---|---|---|---|---|---|---|---|---|
| | 3 | 4 | 5 | 6 | 7 | 8 | 9 | 10 |
| 60 kV 4 mA 5 s | 69.27 | 94.19 | 90.65 | 86.34 | 91.24 | 94.59 | 95.18 | 97.78 |
| 100 kV 4 mA 5 s | 69.68 | 80.33 | 78.03 | 79.68 | 81.58 | 83.85 | 85.89 | 87.72 |

A description of the presented embodiments is provided so that a person skilled in the art of any of the present disclosure may use or practice the present disclosure. Various modifications to these embodiments will be apparent to those skilled in the art of the present disclosure. The general principles defined herein may be applied to other embodiments without departing from the scope of the present disclosure. Thus, the present disclosure should not be limited to the embodiments as presented herein, but should be interpreted in the widest scope consistent with the principles and novel features as presented herein.

What is claimed is:

1. A method for producing a lead-free X-ray shielding material using bismuth iodide, the method comprising:

a first step of producing porous PDMS (Polydimethylsiloxane);

a second step of producing a mixed solution of $BiI_3$ and THF; and a third step of immersing the porous PDMS into the mixed solution such that the $BiI_3$ is loaded into the porous PDMS to produce a $BiI_3$-PDMS composite material.

2. The method of claim 1, wherein the first step includes:

producing a mixed solution by mixing PDMS, a curing agent, and salt (NaCl);

mixing the mixed solution using a centrifuge to bring the salt particles into contact with each other within the PDMS;

curing the mixed solution; and immersing the curing product into water to remove the NaCl therefrom to produce the porous PDMS.

3. The method of claim 1, wherein in the second step, the mixed solution of $BiI_3$ and THF is produced at a ratio of $BiI_3$ 1.4 g:THF 6 ml.

4. The method of claim 1, wherein in the third step, the porous PDMS has been immersed in the mixed solution for 15 to 20 hours.

5. The method of claim 4, wherein in the third step, the porous PDMS is immersed into the mixed solution such that the $BiI_3$ is loaded into the porous PDMS in a repeated manner at least three times.

6. The method of claim 1, wherein the method further comprises, after the third step, drying the PDMS at 50 to 70° C. for 20 to 60 minutes to remove the THF therefrom such that only the $BiI_3$ is loaded into the PDMS.

* * * * *